US012743751B2

(12) United States Patent
Jin et al.

(10) Patent No.: US 12,743,751 B2
(45) Date of Patent: Sep. 22, 2026

(54) IMAGE PROCESSING METHOD, DATA SET COLLECTION METHOD AND IMAGE PROCESSING APPARATUS

(71) Applicants: ANKON TECHNOLOGIES CO., LTD, Wuhan (CN); ANX IP HOLDING PTE. LTD., Singapore (SG)

(72) Inventors: Fan Jin, Wuhan (CN); Hao Zhang, Wuhan (CN); Tianyi Yangdai, Wuhan (CN)

(73) Assignees: ANKON TECHNOLOGIES CO., LTD, Wuhan (CN); ANX IP HOLDING PTE. LTD., Singapore (SG)

( * ) Notice: Subject to any disclaimer, the term of this patent is extended or adjusted under 35 U.S.C. 154(b) by 233 days.

(21) Appl. No.: 18/833,898

(22) PCT Filed: Jan. 13, 2023

(86) PCT No.: PCT/CN2023/072005
§ 371 (c)(1),
(2) Date: Jul. 28, 2024

(87) PCT Pub. No.: WO2023/143108
PCT Pub. Date: Aug. 3, 2023

(65) Prior Publication Data

US 2025/0148576 A1 May 8, 2025

(30) Foreign Application Priority Data

Jan. 27, 2022 (CN) ......................... 202210099410.0

(51) Int. Cl.
*G06T 5/70* (2024.01)
*G06T 3/40* (2006.01)
(Continued)

(52) U.S. Cl.
CPC ................. *G06T 5/70* (2024.01); *G06T 3/40* (2013.01); *G06T 5/10* (2013.01); *G06T 5/40* (2013.01);
(Continued)

(58) Field of Classification Search
None
See application file for complete search history.

(56) References Cited

U.S. PATENT DOCUMENTS 6,490,364 B2 * 12/2002 Hanna .................. H04N 13/243 348/E13.016
7,379,612 B2 * 5/2008 Milanfar .............. G06T 3/4076 382/167
(Continued)

FOREIGN PATENT DOCUMENTS

CN 110120011 A 8/2019
CN 113538245 A 10/2021
CN 113673675 A 11/2021

*Primary Examiner* — Anand P Bhatnagar
(74) *Attorney, Agent, or Firm* — Treasure IP Group, LLC

(57) ABSTRACT

An image processing method and a data set collection method is disclosed. The image processing method includes: making a high-resolution high-definition image interact with a calibrated blur kernel to obtain a blurred image; injecting calibrated noise to form a first noise image; degrading, by using a downsampling method, the first noise image into a low-resolution image; performing lossy compression on the low-resolution image to obtain a compressed image; adding into the compressed image random noise points that simulate a transmission process, to form a second noise image; and performing lossy compression on the second noise image to obtain a low-definition image, where the high-definition image is an image that is formed by means of photographing an organ in a body using a capsule endoscope, and the calibrated blur kernel and calibrated noise are
(Continued)

results that are obtained by means of fitting a photographing process of the high-definition image.

16 Claims, 6 Drawing Sheets

(51) Int. Cl.

| | |
|---|---|
| ***G06T 5/10*** | (2006.01) |
| ***G06T 5/40*** | (2006.01) |
| ***G06V 10/75*** | (2022.01) |
| ***H04N 19/124*** | (2014.01) |
| ***H04N 19/91*** | (2014.01) |

(52) U.S. Cl.

CPC ......... *G06V 10/758* (2022.01); *H04N 19/124* (2014.11); *H04N 19/91* (2014.11); *G06T 2207/10068* (2013.01)

(56) References Cited

U.S. PATENT DOCUMENTS

| | | | | |
|---|---|---|---|---|
| 11,212,543 | B2 * | 12/2021 | Hwang .................. | H04N 19/42 |
| 11,290,345 | B2 * | 3/2022 | Kuo ........................ | H04L 65/80 |
| 12,003,386 | B2 * | 6/2024 | Kuo ........................ | H04L 41/16 |
| 2007/0071362 | A1 * | 3/2007 | Milanfar ............... | G06T 3/4076 382/299 |
| 2010/0021084 | A1 * | 1/2010 | Douglas ................ | G06T 3/4053 382/299 |
| 2014/0177706 | A1 * | 6/2014 | Fernandes ............. | H04N 19/59 375/240.03 |
| 2018/0075581 | A1 * | 3/2018 | Shi ......................... | G06N 3/084 |
| 2021/0112261 | A1 * | 4/2021 | Hwang .................. | H04N 19/42 |

* cited by examiner

IMAGE PROCESSING METHOD, DATA SET COLLECTION METHOD AND IMAGE PROCESSING APPARATUS

CROSS-REFERENCE OF RELATED APPLICATIONS

The application is a National Phase Application of PCT International Application No. PCT/CN2023/072005, International Filing Date Jan. 13, 2023, published Aug. 3, 2023 as International Publication Number WO2023/143108A1, which claims priority from Chinese Patent Application No. 202210099410.0, filed Jan. 27, 2022, all of which are incorporated herein by reference in their entirety.

FIELD OF INVENTION

The present invention relates to an image processing technique, and more particularly to an image processing method, a data set collection method and an image processing apparatus.

BACKGROUND

With the advancement of technology, there is an increasing demand for high-definition, high-resolution images, especially in the field of medical imaging. High-definition medical images can greatly facilitate the attending physician in analyzing the condition of the patient and making a diagnosis. Currently, the method of using a magnetically controlled capsule endoscope for internal examination of the gastrointestinal tract has been widely applied. The capsule endoscope includes an internal magnet that interacts with an external magnet to control the movement of the capsule endoscope within the body, capturing images of the stomach and intestinal walls. Physicians analyze the images to assess the health of the stomach and intestinal walls. Due to hardware limitations of image transmission tools, the captured images often have low resolution, and the details and textures of the stomach and intestinal walls are unclear, significantly hindering the analysis and diagnosis of the physician.

Therefore, techniques such as image super-resolution (abbreviated as ISR), which reconstructs high-resolution images from low-resolution images or image sequences, are needed to enhance the resolution of the images and restore their detailed textures. Existing image super-resolution techniques can be categorized into traditional methods and deep learning-based methods. Traditional methods have been developed over a long time and generally use spatial spline interpolation (e.g., Bilinear Interpolation) to enhance the resolution of input images. However, the high-resolution images generated by the methods tend to be blurry, have amplified noise, and overall low image quality. In contrast, deep learning-based methods rely on the quality of training data. If the training data is poorly designed, the resulting models often do not perform well. Typically, the data set creation method for deep learning involves first obtaining high-definition images and then downsampling the high-resolution images to obtain corresponding low-resolution images, forming low-high resolution image pairs as training data sets. This approach to data set creation is relatively simple and does not fully represent the degradation process of images. Consequently, models trained using such data sets often perform unsatisfactorily in practical applications. Therefore, models built using current deep learning methods with these data sets result in high-resolution images that are still not very clear, leading to poor image restoration effects and affecting image analysis and determination.

SUMMARY OF THE INVENTION

In view of the above problems, it is an object of the present invention to provide an image processing method, a data set collection method and an image processing apparatus, where the degradation process of high-definition images captured by a capsule endoscope within the body is simulated to obtain low-resolution images, so as to acquire high-quality high-definition and low-resolution image data pairs, in order to solve the problems in the prior art.

According to a first aspect of the present invention, an image processing method is provided, comprising:

- making a high-resolution high-definition image interact with a calibrated blur kernel to obtain a blurred image;
- injecting calibrated noise into the blurred image to form a first noise image;
- degrading, by using a downsampling method, the first noise image into a low-resolution image;
- performing lossy compression on the low-resolution image to obtain a compressed image;
- adding into the compressed image random noise points that simulate a transmission process, to form a second noise image; and
- performing lossy compression on the second noise image and saving to obtain a low-quality low-resolution image;
- where the high-definition image is an image that is formed by means of photographing an organ in a body using a capsule endoscope, and the calibrated blur kernel and the calibrated noise are results that are obtained by means of fitting a photographing process of the high-definition image.

Optionally, the calibrated blur kernel comprises a defocus blur kernel and a motion blur kernel. The defocus blur kernel represents image blurring caused by distortion and defocusing by a camera of the capsule endoscope during the photographing process of the high-definition image, and the motion blur kernel represents image blurring caused by a motion of the camera of the capsule endoscope inside the body.

Optionally, the blurred image is a result obtained by simultaneously applying both the defocus blur kernel and the motion blur kernel to the high-definition image.

Optionally, the calibration steps for the defocus blur kernel comprise:

- using the camera to capture inclined lines of a standard color chart, obtaining a pixel value variation curve on both sides of the inclined lines as a pulse signal;
- calculating an edge spread function corresponding to the pulse signal and differentiating the edge spread function to obtain a line spread function;
- rotating the standard chart card at fixed angles to obtain a plurality of the line spread functions corresponding to a plurality of the inclined lines;
- rotating the line spread functions a full circle and then synthesizing into a three-dimensional space to form a point spread function; and
- normalizing the point spread function to obtain the defocus blur kernel.

Optionally, a Gaussian blur kernel is used to simulate the motion blur kernel, and the Gaussian blur kernel comprises an isotropic blur kernel and an anisotropic blur kernel.

Optionally, the calibrated noise comprises dark current noise and Gaussian noise, where the dark current noise represents the noise generated during conversion of an image captured by the camera of the capsule endoscope into a digital signal, and the Gaussian noise represents the noise generated during formation of a RGB image from the image captured by the camera of the capsule endoscope.

Optionally, the calibration steps for the dark current noise comprise:

setting data of an initial image and placing the initial image in a black cloth environment with different camera gains, and after illuminating for a fixed time, statistically analyzing a pixel mean value, a horizontal pixel mean value and a vertical pixel mean value of a full-image of the initial image in each of three RGB channels, respectively;

obtaining a pixel mean value and a variance of the full-image in each channel under different camera gains;

obtaining pixel values of the full-image of the initial image under fixed camera gains, and plotting a histogram of the pixel values of the full-image;

plotting histograms under various function distributions based on the pixel mean values and the variances;

comparing fitting degrees of the histograms under various function distributions with the histogram of the pixel values of the full-image and selecting the best-fitting function distribution as the distribution of the dark current noise.

Optionally, the various function distributions comprises a Gaussian distribution, a Poisson distribution, and a Gamma distribution, and the best-fitting function distribution is the Gamma distribution.

Optionally, the calibration steps for the Gaussian noise comprise:

setting data of an initial image and a plurality of different camera gains;

placing the initial image in a darkroom environment with the different camera gains, and after illuminating for a fixed time, statistically analyzing pixel mean values and variances of the full-image in each of three RGB channels, respectively;

plotting a curve of the pixel mean values and the variances according to the relationship between the pixel mean values and the variances;

obtaining pixel mean values of an image captured by the camera, and finding variances of the image according to the plotted curve; and generating a Gaussian noise with zero pixel mean value based on the obtained variances, where the Gaussian noise follows a Gaussian distribution.

Optionally, the step of injecting calibrated noise into the blurred image to form a first noise image comprises:

obtaining function distributions corresponding to the dark current noise and the Gaussian noise;

injecting the dark current noise and the Gaussian noise into the blurred image according to the function distributions corresponding to the dark current noise and the Gaussian noise to form the first noise image.

Optionally, the first noise image is downsampled twofold using bicubic interpolation to obtain the low-resolution image.

Optionally, a lossy compression coefficient used for compressing the low-resolution image into the compressed image is 70, and a lossy compression coefficient used for compressing the second noise image into the low-resolution image is 90.

Optionally, the steps of lossy compression on the low-resolution image comprises:

converting the image from RGB data to YUV data and performing 4:2:0 chroma subsampling;

dividing the image in YUV data format into 8*8 cells, and performing discrete cosine transformation on each cell;

quantizing the image after performing the discrete cosine transform, and discarding high-frequency data; and performing entropy coding on a matrix corresponding to the quantized image to form the compressed image.

According to a second aspect of the present invention, a data set collection method is provided, comprising:

executing the image processing method;

saving the high-definition image and its corresponding low-resolution image as an image data pair; and obtaining a plurality of image data pairs to create a training data set.

According to a third aspect of the present invention, an image processing apparatus is provided, comprising:

an image blur unit, for making a high-resolution high-definition image interact with a calibrated blur kernel to obtain a blurred image;

a first noise injection unit, for injecting calibrated noise into the blurred image to form a first noise image;

a downsampling unit, for degrading, by using a downsampling method, the first noise image into a low-resolution image;

a first compression unit, for performing lossy compression on the low-resolution image to obtain a compressed image;

a second noise injection unit, for adding into the compressed image random noise points that simulate a transmission process, to form a second noise image; and a second compression unit, for performing lossy compression on the second noise image and saving to obtain a low-quality low-resolution image;

where the high-definition image is an image that is formed by means of photographing an organ in a body using a capsule endoscope, and the calibrated blur kernel and calibrated noise are results that are obtained by means of fitting a photographing process of the high-definition image.

Optionally, the image blur unit is further configured to obtain the calibrated blur kernel, and the calibrated blur kernel comprises a defocus blur kernel and a motion blur kernel; the defocus blur kernel represents image blurring caused by distortion and defocusing by a camera of the capsule endoscope during the photographing process of the high-definition image, and the motion blur kernel represents image blurring caused by a movement of the camera of the capsule endoscope inside the body;

the first noise injection unit is also configured to obtain the calibrated noise, which comprises dark current noise and Gaussian noise; the dark current noise represents the noise generated during conversion of the image captured by the camera of the capsule endoscope into a digital signal, and the Gaussian noise represents the noise generated during the formation of a RGB image from the image captured by the camera of the capsule endoscope.

According to all aspects of the present invention, the degradation process of high-definition images captured by a capsule endoscope within the body is simulated by incorporating blur factors caused by the movement of the capsule endoscope inside the body and noise effects during image conversion, and downsampling and lossy compression methods are used to repeatedly reduce the resolution of high-definition images, so as to obtain low-resolution compressed images, which are further subjected to noise effect introduced during the transmission process and additional lossy compression during the transmission process to obtain degraded images (low-resolution images) that accurately correspond to the high-definition images. This process reasonably describes the actual degradation process of images. The resulting of high-definition and low-resolution image data pairs effectively depict the relationship between the original and degraded images. Consequently, the data set created using this method better reflects the various factors affecting image degradation. As a result, the restored high-resolution images are clearer and more closely resemble the real situation, thereby improving the accuracy and precision of high-definition image recovery. Moreover, the training data set created using the data set collection method of the present invention can be applied in various image processing processes for model building, such as image super-resolution and image denoising.

BRIEF DESCRIPTION OF THE DRAWINGS

The above and other objects, features and advantages of the invention will be apparent upon consideration of the following detailed description, taken in conjunction with the accompanying drawings, in which the reference characters refer to like parts throughout and in which.

DETAILED DESCRIPTION

Figure 1A:
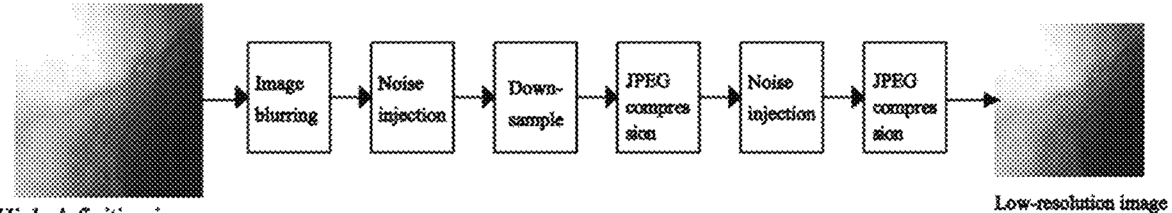
FIG. 1*a* depicts a schematic diagram of a degradation process from a high-definition image to a low-resolution image according to the embodiments of the present invention.

Various embodiments of the present invention will be described in more detail below with reference to the accompanying drawings. In the drawings, the same elements are represented by the same or similar markings. For simplicity and clarity of illustration, elements shown in the drawings are not drawn to scale.

Methods based on deep learning, which employ multi-layer perceptron non-linear nesting to fit the mapping relationship from low-resolution image space to high-resolution image space, can effectively reflect the relationship between low-resolution images and real images. Therefore, in the embodiments of the present invention, deep learning methods are also used to achieve image processing, thereby establishing corresponding data sets to create models applicable to various image processing fields, such as image super-resolution and noise processing. The present invention further provides a data collection method to ensure that the trained models can successfully achieve super-resolution of medical images, such as those from enteroscopies and gastroscopies. Establishing a data set requires first establishing the relationship between high-definition images and low-resolution images. The present invention achieves the creation of high-definition to low-resolution image data pairs through an image processing method. Referring to the background art, factors affecting image degradation include downsampling, blur, noise, and compression loss during image storage. The present invention primarily analyzes the degradation process of images collected by capsule endoscopes for enteroscopy and gastroscopy to establish an accurate data set.

Specific embodiments of the present invention are described in further detail below in conjunction with the accompanying drawings.

Figure 1B:
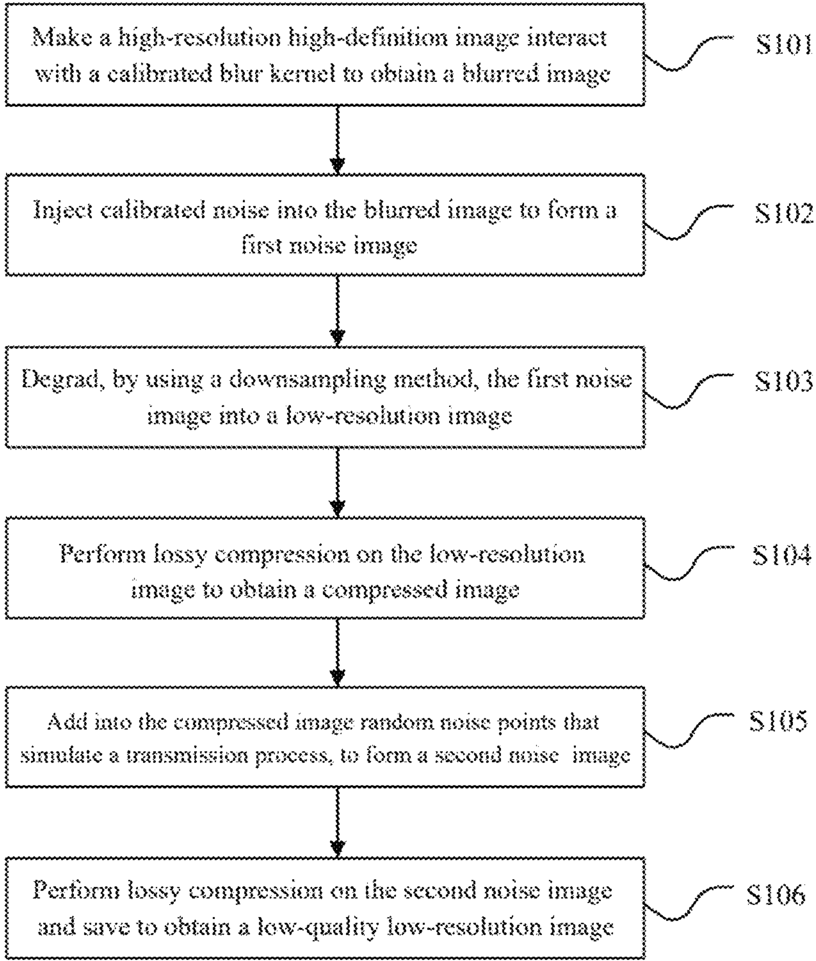
FIG. 1*b* depicts a flowchart of an image processing method according to the embodiments of the present invention.

FIG. 1*a* depicts a schematic diagram of a degradation process from a high-definition image to a low-resolution image according to the embodiments of the present invention; and FIG. 1*b* depicts a flowchart of an image processing method according to the embodiments of the present invention.

As shown in FIG. 1*a*, it illustrates the degradation process from a high-definition image to a low-resolution image according to the embodiments of the present invention. The high-definition image is captured by a capsule endoscope moving inside a human body, taking images of organs such as the stomach and intestines. The capsule endoscope is controlled to move inside the human body through external magnetic induction, such as dragging it across the surface of a target area, capturing images during the movement. Due to friction between the capsule endoscope and the wall of the target area (e.g., the stomach wall), the lens or camera of the capsule endoscope undergoes twisting and motion, leading to distortion, defocusing, and motion blur, which unavoidably causes image blurring. Moreover, the images captured by the lens or the camera introduce certain noise during a digital sensor processing. To reduce transmission costs, images are often compressed or downsampled before transmission. These factors affect the degradation of high-definition images. This embodiment fully considers these factors.

According to FIG. 1*a*, the obtained high-definition image is first blurred by applying a blur kernel to obtain a blurred image. Noise is then injected, followed by downsampling to reduce the image resolution. The image is subsequently compressed using Joint Photographic Experts Group (abbreviated as JPEG) compression (for example, lossy compression) to reduce storage space and facilitate image transmission. Random noise points conforming to a specific distribution are added to simulate the random noise encountered during transmission. The image undergoes another round of JPEG compression during storage to further reduce storage space, ultimately obtaining a low-resolution image. The process can be expressed with a formula (1) as follows:

$$y_0 = (x_{1\downarrow bic} * k_1 + n)_{jpeg}. \qquad \text{Formula (1)}$$

Where, $x_1$ represents the input high-definition image, $y_0$ represents the degraded low-resolution image, ↓ bic represents bicubic interpolation downsampling, $k_1$ represents the blur kernel, n represents noise, and jpeg represents JPEG compression (lossy compression). From the above formula (1), it can be seen that blur, noise, downsampling, and compression all contribute to image degradation. Therefore, to simulate the actual degradation process of enteroscopy and gastroscopy images, a matching image processing method is provided to obtain high-definition to low-resolution image data pairs as samples, and a data collection method is provided. The specific image processing method is shown in FIG. 1*b*.

As shown in FIG. 1*b*, the image processing method according to the embodiments of the present invention mainly comprises the following steps.

Step S101, making a high-resolution high-definition image interact with a calibrated blur kernel to obtain a blurred image.

In this step, the obtained high-resolution high-definition image is first processed with the calibrated blur kernel to obtain a blurred image, corresponding to "image blurring" in FIG. 1*a*. According to the description above, in the formation process of high-definition images captured by a capsule endoscope, the sources of image blurring mainly include two factors: lens blur caused by defocus of lens (or camera) and motion blur caused by scene movement. Thus, the calibrated blur kernel comprises a defocus blur kernel and a motion blur kernel. The defocus blur kernel represents image blurring caused by distortion and defocusing during the image capture process by a camera of the capsule endoscope. The motion blur kernel represents image blurring caused by the motion of the camera of the capsule endoscope inside the body. That is, the calibrated blur kernel is the result of fitting the capturing process of the high-definition image.

Further, the blurred image is the result obtained by simultaneously applying both the defocus blur kernel and the motion blur kernel to the high-definition image. For example, the interaction between the high-definition image and the blur kernel is convolution. The blur kernel is regarded as a matrix, and through convolution, each pixel of the image corresponds to the average value of the surrounding pixels, making each point in the image softer relative to its surroundings, thus achieving the blurring of the high-definition image and reducing the image resolution to obtain the blurred image. The calibration steps of the blur kernel are described in FIGS. 2*a* and 2*b*.

Step S102, injecting calibrated noise into the blurred image to form a first noise image.

In this step, corresponding to "noise injection" in FIG. 1*a*, noise is injected into the blurred image obtained in Step S101. The noise here is the calibrated noise, which mainly comprises dark current noise and Gaussian noise. The dark current noise represents the noise generated during the conversion of the image captured by the camera of the capsule endoscope into a digital signal. The Gaussian noise represents the noise generated during the formation of a RGB image from the image captured by the camera of the capsule endoscope. This process mainly simulates the noise effects during the image formation process by the camera. That is, the calibrated noise is the result of fitting the capturing process of the high-definition image.

This step specifically comprises: obtaining function distributions corresponding to dark current noise and Gaussian noise; injecting the dark current noise and the Gaussian noise into the blurred image according to their respective function distributions to form the first noise image. By injecting noise into the blurred image, the pixel value distribution of each point in the image conforms to the function distribution of the respective noise, thereby reducing the pixel values of each point in the image and reducing the resolution. The calibration steps of the noise are described in FIGS. 4-6.

Step S103, degrading, by using a downsampling method, the first noise image into a low-resolution image.

In this step, the first noise image is downsampled twofold using bicubic interpolation to obtain the low-resolution image. Specifically, during the image transmission process, to reduce transmission power consumption, a two-fold downsampling operation is performed on the input image, reducing the image size to half of the original. A bicubic interpolation downsampling method is used, where 16 surrounding pixels of the sampling point are used for bicubic interpolation. This interpolation sampling method not only considers the influence of the four adjacent points but also considers the rate of change in the grayscale value between adjacent points, achieving a downscaling effect closer to that of a low-resolution image.

Step S104, performing lossy compression on the low-resolution image to obtain a compressed image.

In this step, to ensure transmission efficiency, the low-resolution image undergoes lossy compression (i.e., the first JPEG compression in FIG. 1*a*) to reduce image storage space, obtain a compressed image and reduce the transmission power consumption, thus facilitating subsequent image transmission.

Step S105, adding into the compressed image random noise points that simulate a transmission process, to form a second noise image.

In this step, the noise effect during the image transmission process is simulated by adding noise to the image, reducing the pixel values of each point to form a second noise image. In this embodiment, the noise distribution can also conform to specific function distributions.

Step S106, performing JPEG compression on the second noise image and saving to obtain a low-quality low-resolution image.

In this step, to reduce storage space when saving the image, a certain degree of lossy compression is performed on the image. In this embodiment, the primary method for achieving the two stages of JPEG compression involves using the cv2.encode function and cv2.decode function from the OpenCV library. The lossy compression coefficients used differ between compressing the low-resolution image to the compressed image (Step S104) and compressing the second noise image to the low-resolution image (Step S106), with coefficients of 70 and 90 respectively. During the transmission phase, a compression coefficient of 70 is chosen because experiments have shown that this is the minimal compression coefficient that does not significantly degrade image quality (the smaller the compression coefficient, the higher the compression level). For the image storage phase, a compression coefficient of 90 is chosen as experiments have shown that at this level, the image is visually lossless while still reducing some storage space.

Specifically, the steps for performing lossy compression (JPEG compression) on the image comprise:

converting the image from RGB data to YUV data and performing 4:2:0 chroma subsampling; dividing the image in YUV data format into 8*8 cells, and performing discrete cosine transform (abbreviated as DCT) on each cell; quantizing the image after performing the discrete cosine transform, and discarding high-frequency data; performing entropy coding on the matrix corresponding to the quantized image to form a compressed image.

In the image processing method of this embodiment, the degradation process of high-definition images captured by a capsule endoscope within the body is simulated by incorporating blur factors caused by the movement of the capsule endoscope inside the body and noise effects during image conversion, and downsampling and lossy compression methods are used to repeatedly reduce the resolution of high-definition images, to obtain low-resolution compressed images, and thereby obtain accurate degraded images (low-quality low-resolution images) of the high-definition images corresponding to the actual image degradation process. The low-resolution images obtained through this image processing method can accurately and effectively reflect the various factors influencing high-definition image degradation. Consequently, this allows for the precise acquisition of high-definition to low-resolution image data pairs. The image data pairs obtained using this image processing method can better represent the true degradation process of images. The resulting data set is more accurate, and the restored high-definition images are clearer, with more distinct textures, closely approximating real-world conditions. This facilitates research and analysis of images in the medical field.

Figures 2A, 2B:
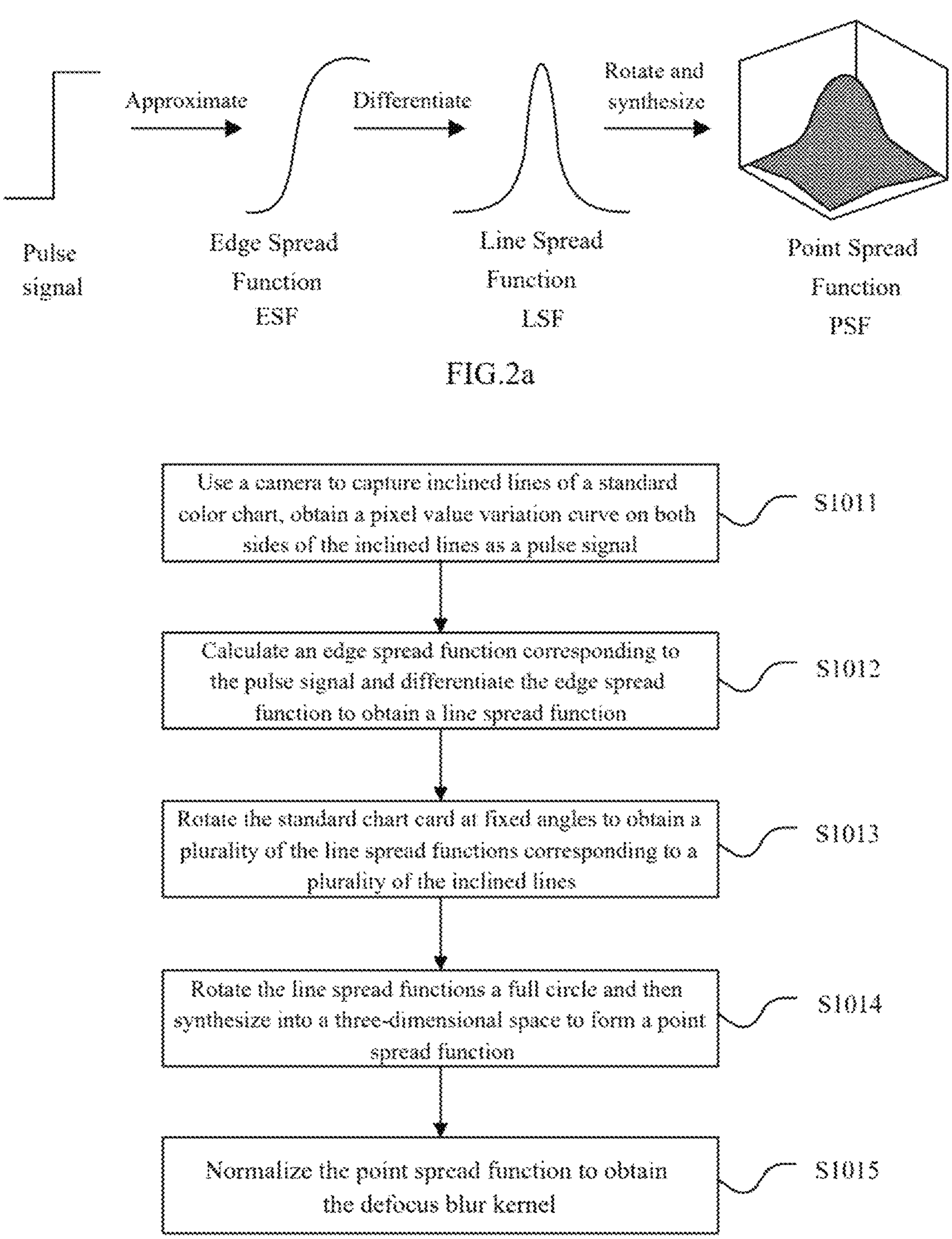
FIG. 2*a* depicts a schematic diagram of the signal change during the calibration process of a defocus blur kernel according to the embodiments of the present invention.
FIG. 2*b* depicts a flowchart of the signal change during the calibration process of the defocus blur kernel according to the embodiments of the present invention.

FIGS. 2*a* and 2*b* respectively depict a schematic diagram and a flowchart of the signal change during a calibration process of the defocus blur kernel according to the embodiments of the present invention.

FIG. 2*b* depicts the calibration process for the defocus blur kernel in Step S101. According to the theory of computational optics, the blur caused by defocus can be described by the Point Spread Function (abbreviated as PSF), which is then used to generate the blur kernel. FIG. 2*a* depicts the process of generating the PSF from a pulse function.

As shown in FIG. 2*a*, first, a pulse signal σ(x) is obtained. Then, the Edge Spread Function (ESF(x)) is calculated according to the pulse function. The ESF is then differentiated to obtain the Line Spread Function (LSF(x)). Finally, the LSF is rotated around a circle and synthesized to obtain the PSF (PSF(x, y)).

As shown in FIG. 2*b*, the calibration process of the defocus blur kernel in this embodiment primarily includes steps S1011 to S1015. Specifically:

In step S1011, using the camera to capture inclined lines of a standard color chart, obtaining the pixel value variation curve on both sides of the inclined lines as a pulse signal.

In this step, it is necessary to obtain the pulse signal, but in practice, it is not possible to obtain the real pulse signal σ(x) during calibration. The inclined lines on the standard color chart are used as the objects for the camera or lens to capture. The pixel value variation curve on both sides of a inclined line is used to approximate the pulse signal σ(x). The left side of the inclined line is set to a darker region and the right side to a brighter region. Consequently, the pixel values smoothly change from left to right, sharply rising from a very low value to a very high value near the inclined line and then smoothly changing again. This curve closely resembles the variation trend of an impulse signal. For example, the standard color chart is disk-shaped, divided into a plurality of inclined lines radiating from the center along the radius, segmenting the chart into regions of different colors. Each side of the inclined line has different colors, and the pixel value distribution of the image captured by the camera approximates the pulse signal.

In step S1012, calculating the edge spread function corresponding to the pulse signal, and differentiating the edge spread function to obtain the line spread function.

In this step, the edge spread function ESF(x) is calculated based on the pulse signal σ(x), and then the edge spread function is differentiated to obtain the corresponding line spread function LSF(x). The edge spread function ESF(x) is preferably a smooth function. The process can be expressed with the formats as follows:

$$ESF(x) \approx \text{smooth}(\sigma(x)); \quad \text{Formula (2)}$$

$$LSF(x) = diff(ESF(x)). \quad \text{Formula (3)}$$

In the Formula (2), ESF(x) represents the edge spread function, and o(x) denotes the pulse signal. Differentiating the edge spread function ESF(x) in Formula (3) obtains a curve similar to a one-dimensional Gaussian distribution (see FIG. 2*a*), which is the line spread function LSF(x). The signal values on both sides of the curve are low and smooth and symmetrical, with a very narrow central region where the signal values are high, the peak signal value is at the highest point and the derivative is zero.

In step S1013, rotating the standard chart card at fixed angles to obtain a plurality of the line spread functions corresponding to a plurality of the inclined lines.

In this step, for example, the standard color chart is rotated by 10 degrees, and the LSF for each inclined line is obtained using the steps mentioned above, resulting in multiple LSFs.

In step S1014, rotating the line spread functions a full circle and then synthesizing into a three-dimensional space to form a point spread function.

In this step, the LSFs are rotated a full circle, and the rotated curves are aligned by their maximum values to form the PSF in three-dimensional space. When rotating along the central axis of the line spread function by 360 degrees, the point spread function PSF(x, y) in three-dimensional space can be obtained, as shown in the rightmost image in FIG. 2*a*. It can be seen that the point spread function has the highest signal value at the vertex, and as it extends outward along the neighborhood, the signal value decreases, which is very similar to the two-dimensional Gaussian blur kernel. Therefore, the defocus blur kernel calibrated in this step can be regarded as a representation of a certain distorted two-dimensional Gaussian blur kernel in linear space.

In step S1015, normalizing the point spread function to obtain the defocus blur kernel.

In this step, the point spread function is regarded as a two-dimensional Gaussian blur curve, with the vertex of the curve in the three-dimensional space as the center. Appropriate values for the length and width range are selected, and finally, normalization is performed to obtain the final defocus blur kernel.

In this embodiment, the defocus blur kernel is calibrated through the steps in FIG. 2*b*, and the motion blur kernel also needs to be calibrated. Due to unavoidable jitter during the image capture by the camera of the capsule endoscope, motion blur is present in the captured images. The Gaussian blur kernel is a general-purpose blur kernel for simulating motion blur and can fit motion blur scenarios well in most cases. Therefore, this embodiment uses a Gaussian blur kernel to simulate the scenario running blur process, using the Gaussian blur kernel as the motion blur kernel. The blur kernel, for example, takes fixed values of [3, 5, 7, 9, 11, 13]. In order to expand the spatial range of the blur kernel, both isotropic blur kernel and anisotropic blur kernel are used to represent the motion blur kernel, aiming to encompass different blur scenarios as much as possible. The formula for the Gaussian blur kernel is as follows:

$$G(x, y) = \frac{1}{2\pi\sigma^2} e^{-\frac{(x-\mu_x)^2+(y-\mu_y)^2}{2\sigma^2}}. \quad \text{Formula (4)}$$

Where, $\sigma$ represents variance, $\mu_x$ and $\mu_y$ represent the mean values in the x direction and y direction, respectively.

This completes the calibration of the defocus blur kernel and the motion blur kernel. According to the relevant algorithm of Gaussian blur, after obtaining the corresponding calibrated blur kernel, it can be convolved with the high-definition image to obtain a blurred image, thus achieving the blurring of the high-definition image. For example, the high-resolution image is first convolved with the defocus blur kernel and then with the motion blur kernel.

Figure 3:
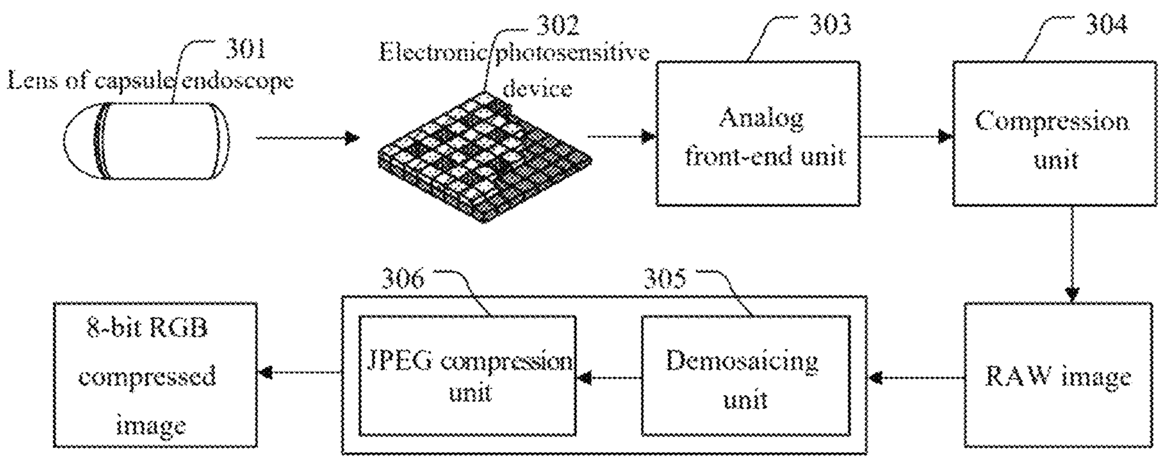
FIG. 3 depicts a schematic diagram of a formation process of the image captured by a capsule endoscope according to the embodiments of the present invention.

FIG. 3 depicts a schematic diagram of a formation process of the image captured by a capsule endoscope according to the embodiments of the present invention.

Figure 4:
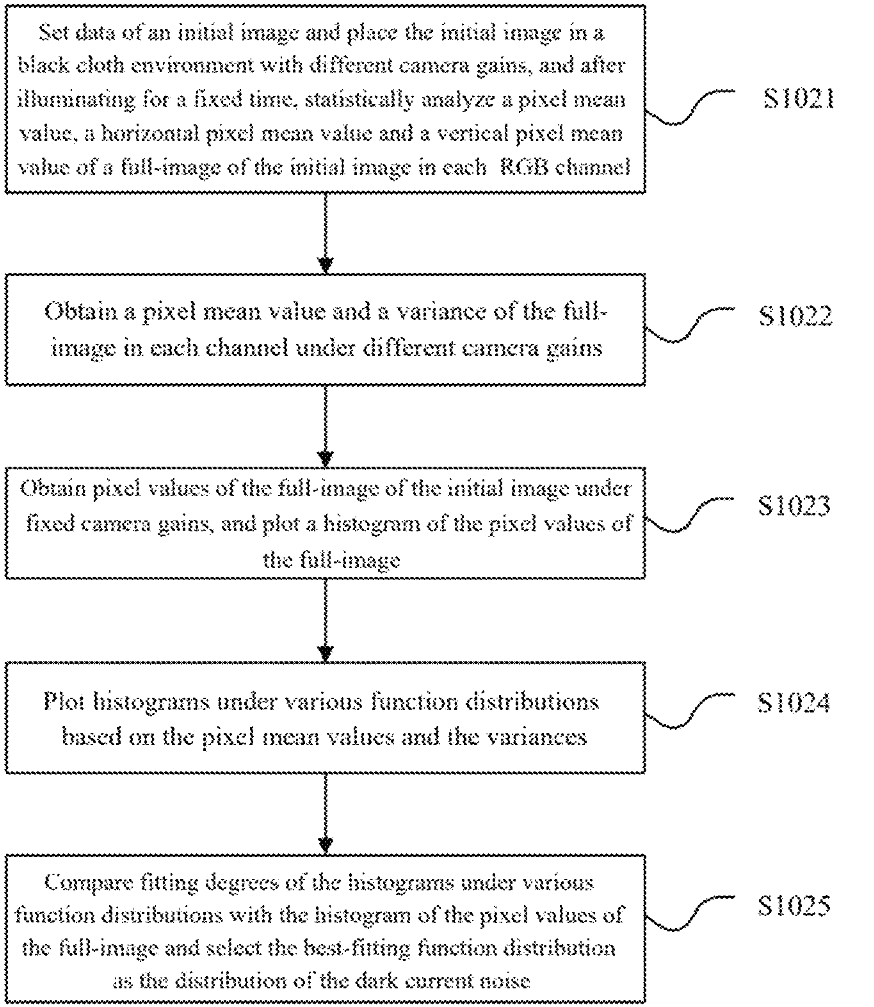
FIG. 4 depicts a flowchart of a calibration process of a dark current noise according to the embodiments of the present invention.
Figure 5A:
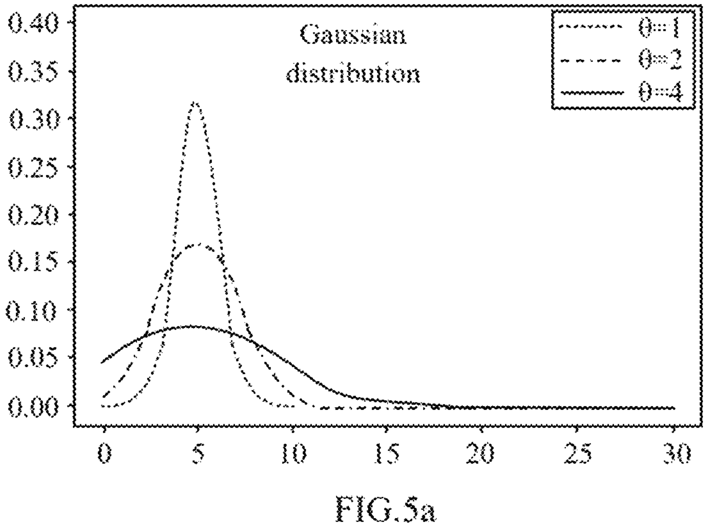
FIG. 5*a* depicts a histogram of pixel distributions conforming to a Gaussian distribution according to the embodiments of the present invention.
Figure 5B:
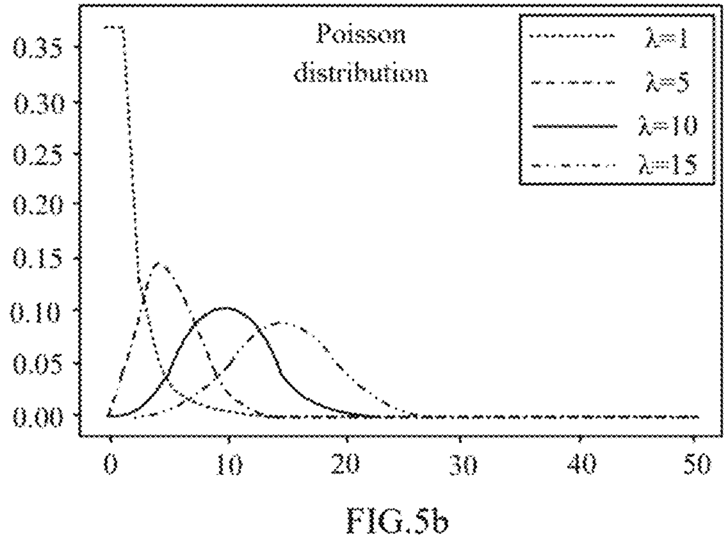
FIG. 5*b* depicts a histogram of pixel distributions conforming to a Poisson distribution according to the embodiments of the present invention.
Figure 5C:
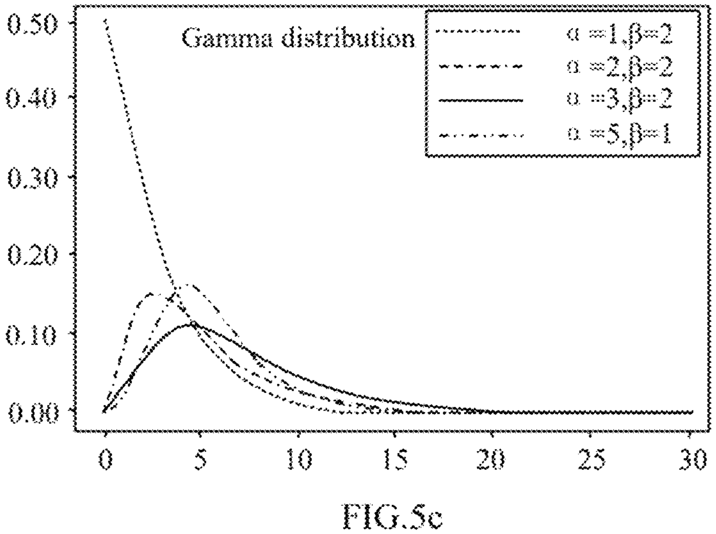
FIG. 5*c* depicts a histogram of pixel distributions conforming to a Gamma distribution according to the embodiments of the present invention.
Figure 6:
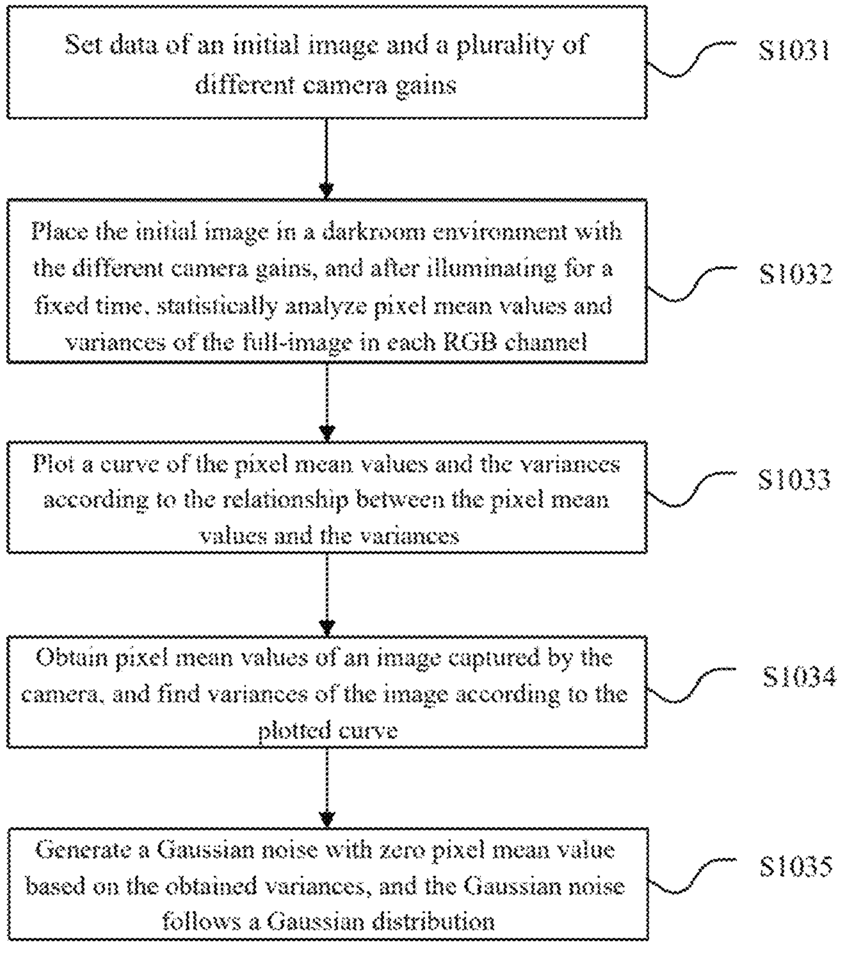
FIG. 6 depicts a flowchart of a calibration process of a Gaussian noise according to the embodiments of the present invention.

As shown in FIG. 3, it is the process of forming gastroscopy image and enteroscopy image taken by a capsule endoscope. First, the lens 301 of the capsule endoscope collects an optical signal and transmits it to the electronic photosensitive device 302 to form the corresponding current signal. Then, an analog front-end unit 303 converts the current signal into a digital signal. After that, a compression unit 304 compresses the digital signal to obtain a RAW image. Finally, the image is processed by a demosaicing unit 305 and a JPEG compression unit 306 to obtain an 8-bit RGB compressed image. After analysis, the noise signal mainly comes from the dark current noise generated by the electronic photosensitive device 302 and the Gaussian noise formed by the demosaicing unit 305 and the JPEG compression unit 306. This embodiment mainly simulates the noise generated during the formation process of the image captured by the camera. Here, only examples of several main types of noise are given, but in practice, there may be more than these two types of noise. FIGS. 4-6 mainly describe how to fit the noise signals generated in the above process.

FIG. 4 depicts a flowchart of a calibration process of a dark current noise according to the embodiments of the present invention. FIGS. 5*a*-5*c* respectively depict the histograms of pixel distributions conforming to a Gaussian distribution, a Poisson distribution, and a Gamma distribution according to the embodiments of the present invention.

As shown in FIG. 4, the calibration process of dark current noise includes steps S1021-S1025.

Step S1021, setting data of an initial image and placing the initial image in a black cloth environment with different camera gains, and after illuminating for a fixed time, statistically analyzing the pixel mean value, horizontal pixel mean value and vertical pixel mean value of the full-image of the initial image in each of the three RGB channels.

In this step, in order to calibrate the dark current noise, first setting the initial image output from the capsule endoscope as 480*480 raw type data and saving in bmp format. Due to different camera gain values being accompanied by different noise intensities, setting the gain values to 1, 2, 4, and 8 respectively, corresponding to saving 100, 102, 100, and 104 images. Then, placing the above image in a black cloth environment, illuminating the image with an LED light for 0-20 ms, and then calculating the pixel mean value, the horizontal pixel mean value, and the vertical pixel mean value of the full-image. Their calculation formulas are as follows:

$$\bar{I}(x, y) = \frac{1}{T}\sum_{t=1}^{T} I(x, y, t); \quad \text{Formula (5)}$$

$$\bar{I}(x) = \frac{1}{T}\sum_{t=1}^{T}\sum_{y=1}^{M} I(x, y, t); \quad \text{Formula (6)}$$

$$\bar{I}(y) = \frac{1}{T}\sum_{t=1}^{T}\sum_{x=1}^{M} I(x, y, t). \quad \text{Formula (7)}$$

Where T represents the time of the last illuminating, M represents the length and width of the image, and I(x, y, t) represents the pixel value at coordinates (x, y) at time t during the illuminating. During calibration, separately calculating the pixel mean value, horizontal pixel mean value and vertical pixel mean value of the full-image of the initial image in each of the three RGB channels. After analysis, it is found that the dark current mean value (pixel mean value) increases with the increase in gain, and the dark current mean value of the R channel is higher than that of the G channel, and the dark current mean value of the G channel is higher than that of the B channel. The dark current mean value of each channel has good consistency, with weak strip textures in some areas.

Step S1022, obtaining the pixel mean value and variance of the full-image in each channel under different camera gains.

In this step, obtaining the pixel mean value of the full-image is followed by calculating the variance of pixels of the full-image. Since the results are measured at different gain values, the relationship between the pixel mean value and variance of the full-image and the gain value for different channels can be obtained. After calibration and testing, when the gain values are {1, 2, 4, 8}, the pixel mean value (dark current mean value) of the R channel ranges from 4.0 to 5.4, the pixel mean value of the G channel ranges from 4.0 to 4.6, and the pixel mean value of the B channel ranges from 4.0 to 4.7. The range of variance (variance of dark current) for the R channel is 0.020-4.698, the range of variance for the G channel is 0.003-1.401, and the range of variance for the B channel is 0.009-2.487.

Step S1023, obtaining the pixel values of the full-image of the initial image under fixed camera gains, and plotting a histogram of the pixel values of the full-image.

In this step, the pixel values of the full-image in each channel at a fixed gain are measured for the initial image, and the histogram of the pixel values of the full-image is plotted through statistical analysis. Due to the pixel values measured with smaller gain values being susceptible to random errors, a larger gain value (gain=8) is used as the basic measurement condition to measure the pixel values of the full-image in each channel and to generate a histogram of the pixel values of the full-image. In the histogram, the horizontal axis represents the pixel value, and the vertical axis represents the distribution probability of the pixel value.

From this, the pixel histogram curve of the full-image can be obtained. This curve follows a certain distribution pattern. The following steps use several conventional function distributions to fit this curve and see which distribution best matches the distribution of the dark current noise.

Step S1024, plotting histograms under various function distributions based on the pixel mean values and variances.

In this step, after obtaining the mean value and variance of the dark current, the next step is to fit the statistical distribution pattern of the dark current. Histograms under various function distributions are plotted based on pixel mean values and variances.

A common noise distribution such as Gaussian Distribution, Poisson Distribution, or Gamma Distribution is used to fit the statistical distribution of the dark current noise. The Gamma distribution is implemented using built-in distribution function of MATLAB, and its probability density function is shown in the following formula (8):

$$f(x) = \frac{1}{b^a\Gamma(a)}x^{a-1}e^{-\frac{x}{b}}. \quad \text{Formula (8)}$$

Where, a and b are the parameters of the Gamma distribution, determined by the mean value and variance; mean value $\mu=ab$, variance $\sigma^2=ab^2$; $\Gamma(a)$ is the gamma function.

The probability density functions of the Gaussian distribution and the Poisson distribution are shown in the following formulas (9) and (10):

$$f(x) = \frac{1}{\sigma\sqrt{2\pi}}\exp\left(-\frac{(x-\mu)^2}{2\sigma^2}\right); \quad \text{Formula (9)}$$

$$P(x = k_2) = \frac{\lambda^{\wedge k} * e^{-\lambda}}{k_2!}. \quad \text{Formula (10)}$$

Where, $\mu$ and $\sigma$ represent the mean value and variance of the Gaussian distribution, $\lambda$ represents the built-in parameter of the Poisson distribution, and $k_2$ is the count number of the Poisson distribution.

Step S1025, comparing the fitting degree of the histograms under various function distributions with the histogram of the pixel values of the full-image and selecting the best-fitting function distribution as the distribution of the dark current noise.

In this step, the histogram curves of the three distributions are compared with the histogram curve of the actual data for fitting degree, and the distribution that is closest to the histogram curve of the actual data is selected. In the experiment, a gain value of gain=8 is used to measure the mean value and variance of the dark current in the RGB channels. When plotting the histograms of the above three distributions based on the mean value and variance, since pixels with values greater than 20 account for only about 0.1%, for display convenience, pixels with values greater than 20 are omitted during the statistics. The curve graphs of the Gaussian distribution, Poisson distribution, and Gamma distribution are shown in FIGS. 5*a* to 5*c*, respectively.

As shown in FIGS. 5*a* to 5*c*, according to the curve graphs of the three statistical distributions, it can be seen that as the variance $\sigma$ ($\theta$ in FIG. 5*a* represents the variance) increases, the Gaussian distribution curve becomes flatter. The shape of the Poisson distribution curve is greatly influenced by the $\lambda$ value. As $\lambda$ increases, the peak of the curve gradually shifts to the right. The shape of the Gamma distribution curve is determined by the two parameters a and b (i.e., the parameters $\alpha$ and $\beta$ in FIG. 5*c*, where $\alpha$=a and $\beta$=1/b), and its waveform changes slightly with the variation of these parameters. Through verification, it finds that the histogram curve of the Gamma distribution fits the histogram curve of the actual data the best, with both the curve shape and pixel values being relatively close. The Gaussian distribution is second, and the curve of the Poisson distribution has the greatest difference from the histogram curve of the actual data, with significant differences in both curve shape and pixel values. Therefore, the Gamma distribution is ultimately chosen as the distribution for the dark current noise. Alternatively, in this embodiment, only several common function distributions are provided to fit the histogram curve of the pixel values of the actual image. The most fitting function distribution is selected from them. In practical applications, other suitable function distributions can also be chosen to fit based on the shape of the curve and other factors.

After obtaining the distribution of the dark current noise, injecting it into the image, making the distribution of pixel values at each point in the image match the distribution of the dark current noise, thereby reducing the resolution of the image.

FIG. 6 depicts a flowchart of the calibration process of a Gaussian noise according to the embodiments of the present invention.

As shown in FIG. 6, the process of calibrating Gaussian noise is similar to the process of calibrating the dark current noise. The calibration process for Gaussian noise includes steps S1031-S1035.

Step S1031, setting data of the initial image and a plurality of different camera gains.

In this step, the initial image output from the capsule endoscope is set to raw type data with a resolution of 480*480, saved as a bmp image format, and the values of the camera gains are set to 1, 2, 4, and 8 respectively.

Step S1032, placing the initial image in a darkroom environment with the different camera gains, and after illuminating for a fixed time, statistically analyzing the pixel mean values and variances of the full-image in each of the three RGB channels.

In this step, the initial image is placed in a darkroom environment with different camera gains, illuminated under an LED light for a few milliseconds, and photographing is against white paper in the darkroom. The values of the camera gains are set to 1, 2, 4, and 8, corresponding to the saving of 100, 102, 100, and 104 images, respectively. Then the pixel mean value and variance of the full-image in the three RGB channels are calculated. Their calculation formulas are as follows (11) and (12):

$$\bar{I}(x, y) = \frac{1}{T}\sum_{t=1}^{T} I(x, y, t); \quad \text{Formula (11)}$$

$$V(x, y) = \frac{1}{T}\sum_{t=1}^{T}\left(I(x, y, t) - \bar{I}(x, y)\right)^2. \quad \text{Formula (12)}$$

Where, T is the last illuminating moment, I(x, y, t) is the pixel value at the (x, y) coordinates in the image during the t-th illuminating.

Step S1033, plotting a curve of the pixel mean values and the variances according to the relationship between the pixel mean values and the variances.

In this step, the relationship between pixel mean value and variance is analyzed, to plot a graph of a mean value-variance curve ($\bar{I}$~V curve graph), with the horizontal axis representing the mean value (mean) and the vertical axis representing the variance (var). The experiment found that the $\bar{I}$~V curve graphs of the three channels all have characteristic peaks, with three distinct peaks in the curves. In order to fit the actual data curve, it is assumed that the $\bar{I}$~V curve is composed of four parts: $y=y_1+y_2+y_3+y_4$, where, $$y_1 = k_3 x + d,$$

$$y_2 = a_2 \exp\left(-\frac{(x-95)^2}{25^2}\right),$$

$$y_3 = a_3 \exp\left(-\frac{(x-140)^2}{18^2}\right),$$

$$y_4 = a_4 \exp\left(-\frac{(x-200)^2}{15^2}\right),$$

where $k_3$, d, $a_2$, $a_3$, $a_4$ are calibration parameters.

Step S1034, obtaining the pixel mean values of the image captured by the camera, and finding the variance of the image according to the plotted curve.

In this step, due to the difficulty of calculating variance, a mean value-variance curve is first plotted based on experimental data, and then the pixel mean values of the actual captured image is obtained. According to the $\bar{I}$~V curve graph from the previous step, the variance corresponding to the mean value is obtained. To obtain the variance, simply substitute the mean value into the appropriate formula among y1 to y4 above to obtain the value of the variance.

Step S1035, generating a Gaussian noise with zero pixel mean value based on the obtained variance, where the Gaussian noise follows a Gaussian distribution.

In this step, Gaussian noise with zero pixel mean value is generated using the obtained variance. Since the distribution of Gaussian noise follows a Gaussian distribution, a Gaussian noise curve with zero pixel mean value under the corresponding variance can be obtained. Adding Gaussian noise that conforms to this distribution to the image, so that the distribution of pixel values at each point conforms to a Gaussian distribution, thereby reducing the pixel values of the image.

Figure 7:
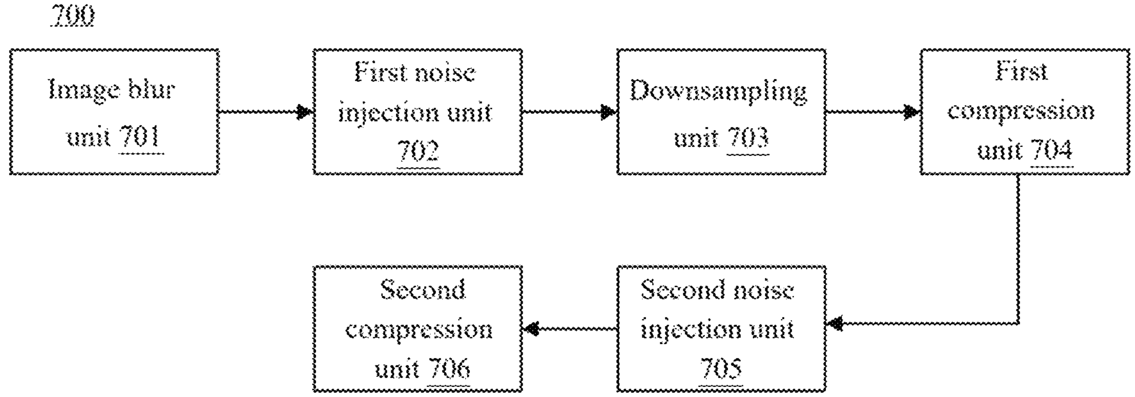
FIG. 7 depicts a simplified schematic diagram of an image processing apparatus according to the embodiments of the present invention.

Accordingly, the present invention also provides an image processing apparatus for implementing the image processing method of the above embodiments, as shown in FIG. 7.

FIG. 7 depicts a simplified schematic diagram of an image processing apparatus according to the embodiments of the present invention.

As shown in FIG. 7, the image processing apparatus 700 according to the embodiment comprises: an image blur unit 701, a first noise injection unit 702, a downsampling unit 703, a first compression unit 704, a second noise injection unit 705, and a second compression unit 706. In one embodiment, the image processing apparatus 700 is a computer or a server comprising one or more processors and a memory, the units referred to the embodiments are stored in the memory and are executed by the one or more processors.

The image blur unit 701 is used for making a high-resolution high-definition image interact with a calibrated blur kernel to obtain a blurred image. The first noise injection unit 702 is used for injecting calibrated noise into the blurred image to form a first noise image. The downsampling unit 703 is used for degrading, by using a downsampling method, the first noise image into a low-resolution image. The first compression unit 704 is used for performing lossy compression on the low-resolution image to reduce storage space and obtain a compressed image. The second noise injection unit 705 is used for adding into the compressed image random noise points that simulate a transmission process, to form a second noise image. The second compression unit 706 is used for performing lossy compression on the second noise image and saving to obtain a low-quality low-resolution image. Where, the high-definition image is an image that is formed by photographing an organ in a body using a capsule endoscope, and the calibrated blur kernel and calibrated noise are results that are obtained by fitting a photographing process of the high-definition image.

The image blur unit is 701 is also configured to obtain the calibrated blur kernel, which comprises a defocus blur kernel and a motion blur kernel. The defocus blur kernel represents image blurring caused by distortion and defocusing during the image capture process by a camera of the capsule endoscope. The motion blur kernel represents image blurring caused by the motion of the camera of the capsule endoscope inside the body. The first noise injection unit 702 is also configured to obtain the calibrated noise, which comprises dark current noise and Gaussian noise. The dark current noise represents the noise generated during the conversion of the image captured by the camera of the capsule endoscope into a digital signal. The Gaussian noise represents the noise generated during the formation of a RGB image from the image captured by the camera of the capsule endoscope.

Further, the first noise injection unit 702 and the second noise injection unit 705 can be combined into the same unit, such as a noise injection unit. Similarly, the first compression unit 704 and the second compression unit 706 can be combined into a compression unit. Therefore, the image processing apparatus disclosed herein comprises four units: an image blur unit, a noise injection unit, a downsampling unit, and a compression unit, which respectively perform corresponding functions to reduce the resolution of high-definition images and obtain low-resolution images.

In the image processing method and apparatus of this embodiment, the degradation process of high-definition images captured by a capsule endoscope within the body is simulated by incorporating blur factors caused by the movement of the capsule endoscope inside the body and noise effects during image conversion, and downsampling and lossy compression methods are used to repeatedly reduce the resolution of high-definition images, to obtain low-resolution compressed images. Furthermore, noise effects simulating the transmission process and additional lossy compression during transmission are added to the compressed image, thereby obtaining an accurate degraded image (low-resolution image) of the high-definition image that conforms to the actual image degradation process. The low-resolution images obtained through the image processing method can accurately and effectively reflect the various factors influencing high-definition image degradation. Consequently, this allows for the precise acquisition of high-definition to low-resolution image data pairs, and corresponding data sets and models can be established, as shown in the embodiment in FIG. 8.

Figure 8:
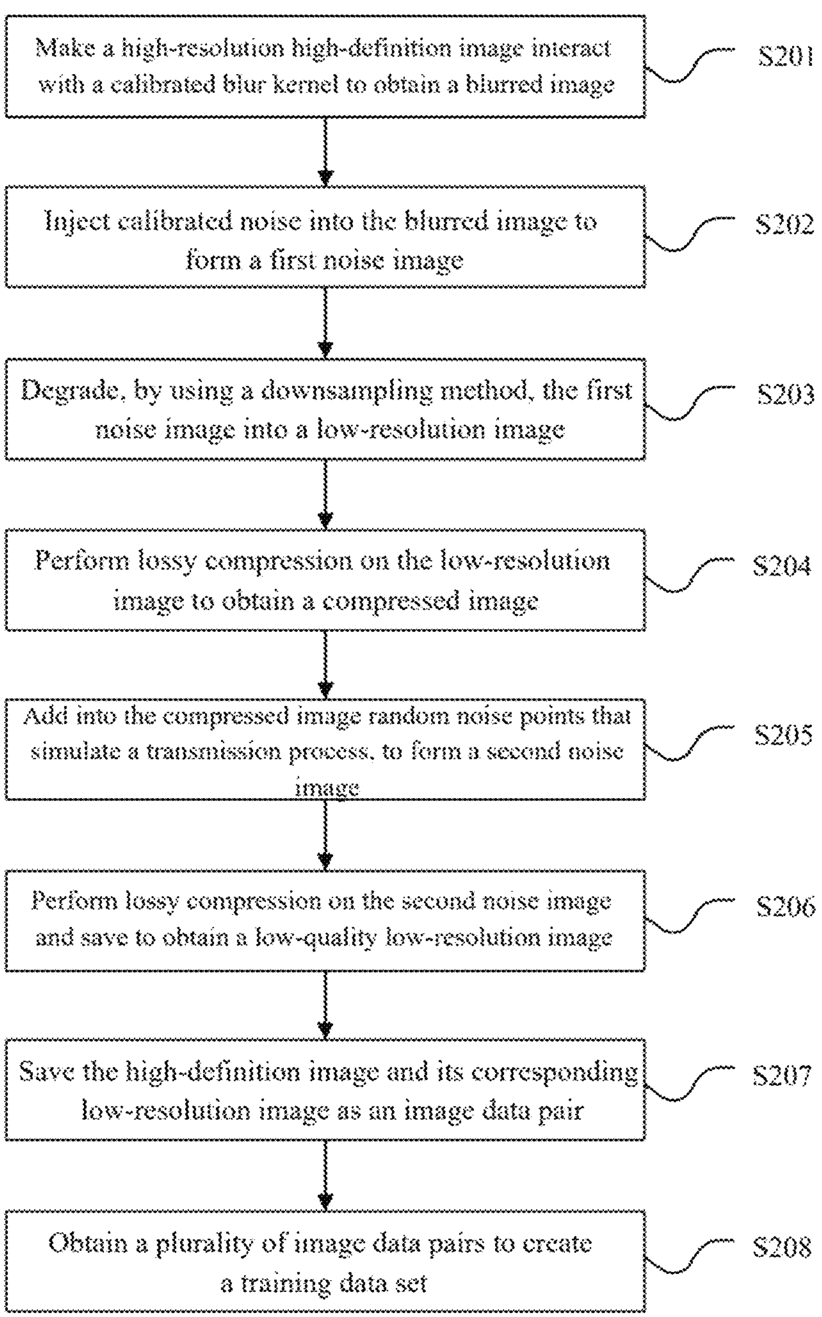
FIG. 8 depicts a flowchart of a data set collection method according to the embodiments of the present invention.

FIG. 8 depicts a flowchart of a data set collection method according to the embodiments of the present invention.

As shown in FIG. 8, the data set collection method of this embodiment includes steps S201-S208. Steps S201-S206 are exactly the same as steps S101-S106 in FIG. 1*b*. The data set collection method of this embodiment is implemented based on the image processing method described in the embodiments of FIGS. 1a-6. The same steps are not repeated here, and steps S207-S208 are mainly introduced.

Step S201, making a high-resolution high-definition image interact with a calibrated blur kernel to obtain a blurred image.

Step S202, injecting calibrated noise into the blurred image to form a first noise image.

Step S203, degrading, by using a downsampling method, the first noise image into a low-resolution image.

Step S204, performing lossy compression on the low-resolution image to obtain a compressed image.

Step S205, adding into the compressed image random noise points that simulate a transmission process, to form a second noise image.

Step S206, performing lossy compression on the second noise image and saving to obtain a low-quality low-resolution image.

Step S207, saving the high-definition image and its corresponding low-resolution image as a pair of image data pairs.

In this step, the degraded low-resolution image obtained above and the original unprocessed high-definition image are saved as a high-definition and low-resolution image data pair.

Step S208, obtaining a plurality of image data pairs to create a training data set.

In this step, the above steps S201-S206 are repeated to obtain a plurality of low-resolution images corresponding to the high-definition images, a plurality of high-definition and low resolution image data pairs are established, and the image data pairs together as used as the training data set. The training data set established by the data collection method of this embodiment can be applied to the collection of sample sets during model establishment in various image processing processes, such as image super-resolution, image deblurring, and image denoising. This improves the precision and accuracy of image processing, can well reflect the texture of various parts of the image, and facilitates medical analysis and research.

According to all aspects of the present invention, the degradation process of high-definition images captured by a capsule endoscope within the body is simulated by incorporating blur factors caused by the movement of the capsule endoscope inside the body and noise effects during image conversion, and downsampling and lossy compression methods are used to repeatedly reduce the resolution of high-definition images, so as to obtain low-resolution compressed images. Furthermore, noise effects simulating the transmission process and additional lossy compression during transmission are added to the compressed images, thereby obtaining more accurate degraded images (low-resolution images). This process reasonably describes the actual degradation process of images. The resulting high-definition and low-resolution image data pairs effectively depict the relationship between the original and degraded images. Consequently, the data set created using this method better reflects the various factors affecting image degradation. As a result, the restored high-definition images are clearer and more closely resemble the real situation. According to the data collection method disclosed herein, the training data set produced can be applied to the establishment of sample sets during the model building process in various image processing tasks.

In accordance with embodiments of the present invention as described above, these embodiments do not elaborate all details, and do not limit the present invention to said embodiments. Obviously, a plurality of modifications and changes can be made based on the above description. These embodiments have been selected and specifically described in the description in order to better explain the principles and practical applications of the present invention, so those skilled in the art can make good use of the present invention and the modify based on the present invention. The present invention is limited only by the claims and their full scope and equivalents.

The invention claimed is:

1. An image processing method, comprising:

making a high-resolution high-definition image interact with a calibrated blur kernel to obtain a blurred image;

injecting calibrated noise into the blurred image to form a first noise image;

degrading, by using a downsampling method, the first noise image into a low-resolution image;

performing lossy compression on the low-resolution image to obtain a compressed image;

adding into the compressed image random noise points that simulate a transmission process, to form a second noise image; and performing lossy compression on the second noise image and saving to obtain a low-quality low-resolution image;

wherein the high-definition image is an image that is formed by means of photographing an organ in a body using a capsule endoscope, and the calibrated blur kernel and the calibrated noise are results that are obtained by means of fitting a photographing process of the high-definition image.

2. The image processing method of claim 1, wherein the calibrated blur kernel comprises a defocus blur kernel and a motion blur kernel, wherein the defocus blur kernel represents image blurring caused by distortion and defocusing by a camera of the capsule endoscope during the photographing process of the high-definition image, and the motion blur kernel represents image blurring caused by a motion of the camera of the capsule endoscope inside the body.

3. The image processing method of claim 2, wherein the blurred image is a result obtained by simultaneously applying both the defocus blur kernel and the motion blur kernel to the high-definition image.

4. The image processing method of claim 2, wherein the calibration steps of the defocus blur kernel comprise:

using the camera to capture inclined lines of a standard color chart, obtaining a pixel value variation curve on both sides of the inclined lines as a pulse signal;

calculating an edge spread function corresponding to the pulse signal and differentiating the edge spread function to obtain a line spread function;

rotating the standard chart card at fixed angles to obtain a plurality of the line spread functions corresponding to a plurality of the inclined lines;

rotating the line spread functions a full circle and then synthesizing into a three-dimensional space to form a point spread function; and normalizing the point spread function to obtain the defocus blur kernel.

5. The image processing method of claim 2, wherein a Gaussian blur kernel is used to simulate the motion blur kernel, and the Gaussian blur kernel comprises an isotropic blur kernel and an anisotropic blur kernel.

6. The image processing method of claim 1, wherein the calibrated noise comprises dark current noise and Gaussian noise, wherein the dark current noise represents the noise generated during conversion of an image captured by a camera of the capsule endoscope into a digital signal, and the Gaussian noise represents the noise generated during formation of a RGB image from the image captured by the camera of the capsule endoscope.

7. The image processing method of claim 6, wherein the calibration steps of the dark current noise comprise:

setting data of an initial image and placing the initial image in a black cloth environment with different camera gains, and after illuminating for a fixed time, statistically analyzing a pixel mean value, a horizontal pixel mean value and a vertical pixel mean value of a full-image of the initial image in each of three RGB channels, respectively;

obtaining a pixel mean value and a variance of the full-image in each channel under different camera gains;

obtaining pixel values of the full-image of the initial image under fixed camera gains, and plotting a histogram of the pixel values of the full-image;

plotting histograms under various function distributions based on the pixel mean values and the variances;

comparing fitting degrees of the histograms under various function distributions with the histogram of the pixel values of the full-image and selecting the best-fitting function distribution as the distribution of the dark current noise.

8. The image processing method of claim 7, wherein the various function distributions comprises a Gaussian distribution, a Poisson distribution, and a Gamma distribution, and the best-fitting function distribution is the Gamma distribution.

9. The image processing method of claim 6, wherein the calibration steps of the Gaussian noise comprise:

setting data of an initial image and a plurality of different camera gains;

placing the initial image in a darkroom environment with the different camera gains, and after illuminating for a fixed time, statistically analyzing pixel mean values and variances of the full-image in each of three RGB channels, respectively;

plotting a curve of the pixel mean values and the variances according to the relationship between the pixel mean values and the variances;

obtaining pixel mean values of an image captured by the camera, and finding variances of the image according to the plotted curve; and generating a Gaussian noise with zero pixel mean value based on the obtained variances, wherein the Gaussian noise follows a Gaussian distribution.

10. The image processing method of claim 6, wherein the step of injecting calibrated noise into the blurred image to form a first noise image comprises:

obtaining function distributions corresponding to the dark current noise and the Gaussian noise;

injecting the dark current noise and the Gaussian noise into the blurred image according to the function distributions corresponding to the dark current noise and the Gaussian noise to form the first noise image.

11. The image processing method of claim 1, wherein the first noise image is downsampled twofold using bicubic interpolation to obtain the low-resolution image.

12. The image processing method of claim 1, wherein a lossy compression coefficient used for compressing the low-resolution image into the compressed image is 70, and a lossy compression coefficient used for compressing the second noise image into the low-resolution image is 90.

13. The image processing method of claim 12, wherein the steps of lossy compression on the low-resolution image comprises:

converting the image from RGB data to YUV data and performing 4:2:0 chroma subsampling;

dividing the image in YUV data format into 8*8 cells, and performing discrete cosine transformation on each cell;

quantizing the image after performing the discrete cosine transform, and discarding high-frequency data; and performing entropy coding on a matrix corresponding to the quantized image to form the compressed image.

14. A data collection method, comprising:

executing the image processing method of claim 1; and saving the high-definition image and its corresponding low-resolution image as an image data pair; and obtaining a plurality of image data pairs to create a training data set.

15. An image processing apparatus, comprising:

an image blur unit, for making a high-resolution high-definition image interact with a calibrated blur kernel to obtain a blurred image;

a first noise injection unit, for injecting calibrated noise into the blurred image to form a first noise image;

a downsampling unit, for degrading, by using a downsampling method, the first noise image into a low-resolution image;

a first compression unit, for performing lossy compression on the low-resolution image to obtain a compressed image;

a second noise injection unit, for adding into the compressed image random noise points that simulate a transmission process, to form a second noise image; and a second compression unit, for performing lossy compression on the second noise image and saving to obtain a low-quality low-resolution image;

wherein the high-definition image is an image that is formed by means of photographing an organ in a body using a capsule endoscope, and the calibrated blur kernel and calibrated noise are results that are obtained by means of fitting a photographing process of the high-definition image.

16. The image processing apparatus of claim 15, wherein the image blur unit is further configured to obtain the calibrated blur kernel, and the calibrated blur kernel comprises a defocus blur kernel and a motion blur kernel, wherein the defocus blur kernel represents image blurring caused by distortion and defocusing by a camera of the capsule endoscope during the photographing process of the high-definition image, and the motion blur kernel represents image blurring caused by a movement of the camera of the capsule endoscope inside the body;

wherein the first noise injection unit is also configured to obtain the calibrated noise, which comprises dark current noise and Gaussian noise, wherein the dark current noise represents the noise generated during conversion of the image captured by the camera of the capsule endoscope into a digital signal, and the Gaussian noise represents the noise generated during the formation of a RGB image from the image captured by the camera of the capsule endoscope.

* * * * *